United States Patent
Rune et al.

(10) Patent No.: US 9,549,391 B2
(45) Date of Patent: Jan. 17, 2017

(54) CONDITIONAL PAGING

(71) Applicant: Telefonaktiebolaget L M Ericsson (publ), Stockholm (SE)

(72) Inventors: Johan Rune, Lidingö (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/766,530

(22) PCT Filed: Feb. 7, 2013

(86) PCT No.: PCT/SE2013/050100
§ 371 (c)(1),
(2) Date: Aug. 7, 2015

(87) PCT Pub. No.: WO2014/123462
PCT Pub. Date: Aug. 14, 2014

(65) Prior Publication Data
US 2015/0382320 A1    Dec. 31, 2015

(51) Int. Cl.
*H04W 68/02* (2009.01)
*H04W 4/20* (2009.01)
*H04L 12/801* (2013.01)
*H04W 72/04* (2009.01)

(52) U.S. Cl.
CPC .............. *H04W 68/02* (2013.01); *H04L 47/29* (2013.01); *H04W 4/20* (2013.01); *H04W 72/0486* (2013.01)

(58) Field of Classification Search
CPC ...... H04W 68/00; H04W 68/02; H04W 36/22; H04W 72/0486; H04W 48/16; H04W 24/08; H04L 47/29; H04L 43/08; H04B 7/0617

USPC ... 455/426.1, 509, 446, 435.3; 370/252, 311
See application file for complete search history.

(56) References Cited

U.S. PATENT DOCUMENTS

| | | | |
|---|---|---|---|
| 2005/0009547 A1* | 1/2005 | Harris | H04W 68/00 455/509 |
| 2006/0003771 A1* | 1/2006 | Heino | H04W 36/22 455/446 |
| 2013/0094371 A1 | 4/2013 | Vallath et al. | |

FOREIGN PATENT DOCUMENTS

| CN | 102387563 A | 3/2012 |
|---|---|---|
| EP | 0732863 A2 | 9/1996 |
| WO | 2011053649 A2 | 5/2011 |
| WO | 2011162667 A1 | 12/2011 |

OTHER PUBLICATIONS

3GPP, "3rd Generation Partnership Project; Technical Specification Group Radio Access Network; UTRAN Iub interface user plane protocols for Common Transport Channel data streams (Release 10)", 3GPP TS 25.435 V10.4.0, Dec. 2011, 1-61.
Lee, D. J. et al., "Sequential Paging Schemes Considering Two Classes of Paging Traffic", Electronics Letters, vol. 35, No. 14, Jul. 8, 1999, 1-2.

* cited by examiner

*Primary Examiner* — Phuoc H Doan
(74) *Attorney, Agent, or Firm* — Murphy, Bilak & Homiller, PLLC

(57) ABSTRACT

Embodiments herein relate to a method in a radio network node (12,13) for paging a user equipment (10) in a radio communications network (1), which radio network node (12, 13) serves a cell (11) in the radio communications network (1). The radio network node (12, 13) determines whether a condition is fulfilled, which condition is associated with the cell (11). The radio network node (12, 13), when the condition is fulfilled, pages the user equipment (10) in the cell (11).

22 Claims, 7 Drawing Sheets

CONDITIONAL PAGING

TECHNICAL FIELD

Embodiments herein relate to a radio network node, a network node, a system and methods therein. In particular, embodiments relate to paging of a user equipment in the radio communications network.

BACKGROUND

In a typical radio communications network, wireless terminals, also known as mobile stations and/or user equipments (UE), communicate via a Radio Access Network (RAN) with or via one or more core networks. The radio access network covers a geographical area which is divided into cell areas, with each cell area, or group of cell areas, being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g., eNodeBs in LTE, and the core network. As such, the RAN of an EPS system has an essentially "flat" architecture comprising radio base station nodes without reporting to RNCs.

Caching concepts, i.e. caching data intended for a user equipment within the radio communications network, are being considered for radio communications networks for the dual purposes of making more efficient use of network resources and improving the end user service experience, e.g. the Quality of Experience (QoE). Sometimes these two goals can be achieved simultaneously, while other times only one of the aspects may be the target. For instance, by delivering requested content from a network cache instead of a remote server, network resources are saved, while at the same time reducing the download delay experienced by the user.

It is not certain where in the network architecture a cache will be placed. It may be integrated in basically any user plane node or be a stand-alone entity in either the radio access network or the Core Network (CN) or it may be deployed above a Gi interface, which is the IP based interface between the Gateway General Packet Radio Service (GPRS) support node (GGSN) and a Public Data Network (PDN) either directly to the Internet or through a Wireless Application Protocol (WAP) gateway, or an SGi interface, which is the interface between the PDN Gateway (PGW). Currently it seems likely that it will be concluded that downlink data from the cache should pass over the Gi/SGi interface. The main rationale for this probable conclusion is that this makes it straightforward to apply core network functions like charging and lawful interception to the data flows.

In the most common uses of caches data is delivered from the cache on request from a client application or device, such as a UE, but caches may also be used to push data to a client application or device or to deliver data based on delivery subscriptions or delay insensitive requests, e.g. to a UE. A problem with the delivery of cached data arises when the network does not know in which cell the user equipment is located. The user equipment needs to be paged in a lot of cells, which may result in waste of resources such as radio resources and user equipment resources.

SUMMARY

An object of embodiments herein is to provide a mechanism that uses resources in an efficient manner when paging a user equipment in a radio communication network.

According to an aspect of embodiments herein, the object is achieved by a method in a radio network node for paging a user equipment in a radio communications network. The radio network node serves a cell in the radio communications network. The radio network node determines whether a condition is fulfilled, which condition is associated with the cell. When the condition is fulfilled, the radio network node pages the user equipment in the cell.

According to another aspect of embodiments herein, the object is achieved by a method in a network node for triggering a paging of a user equipment within a radio communications network. The user equipment is served in a cell of the radio communications network and which network node is comprised in the radio communications network. The network node sets an indication indicating that paging of the user equipment is only to be performed when a condition is fulfilled, which condition is associated with the cell. The network node transmits the indication to a radio network node controlling the cell in the radio communications network.

According to yet another aspect of embodiments herein, the object is achieved by a radio network node for paging a user equipment in a radio communications network. The radio network node is configured to serve a cell in the radio communications network. The radio network node comprises a processing circuit configured to determine whether a condition is fulfilled, which condition is associated with the cell. The radio network node further comprises a transmitter configured to page, when the condition is fulfilled, the user equipment in the cell.

According to still another aspect of embodiments herein, the object is achieved by a network node for triggering a paging of a user equipment within a radio communications network. The user equipment is served in a cell of the radio communications network. The network node comprises a setting circuit configured to set an indication indicating that paging of the user equipment is only to be performed when a condition is fulfilled, which condition is associated with the cell. The network node further comprises a transmitting circuit configured to transmit the indication to a radio network node controlling the cell in the radio communications network.

According to an additional aspect of embodiments herein, the object is achieved by a system for paging the user equipment in the radio communications network. The user equipment is configured to be served in a cell of the radio communications network. The system comprises a network node and a radio network node that is configured to control the cell and is connected to the network node in the radio communications network. The network node is configured to set an indication indicating that paging of the user equipment is only to be performed when a condition is fulfilled. The condition is associated with the cell. The network node is further configured to transmit the indication to the radio network node controlling the cell in the radio communications network. Then, the radio network node is configured to determine whether the condition is fulfilled; and, when the condition is fulfilled, the radio network node is configured to page the user equipment in the cell.

By using a condition to decide whether to page a user equipment or not in the cell of the radio communications network, the paging of the user equipment in certain periods, e.g. hectic periods of heavy load, in the cell is avoided. Hence, the resources of the radio communications network are used in an efficient manner.

BRIEF DESCRIPTION OF THE DRAWINGS

Embodiments will now be described in more detail in relation to the enclosed drawings, in which.

DETAILED DESCRIPTION

Figure 1:
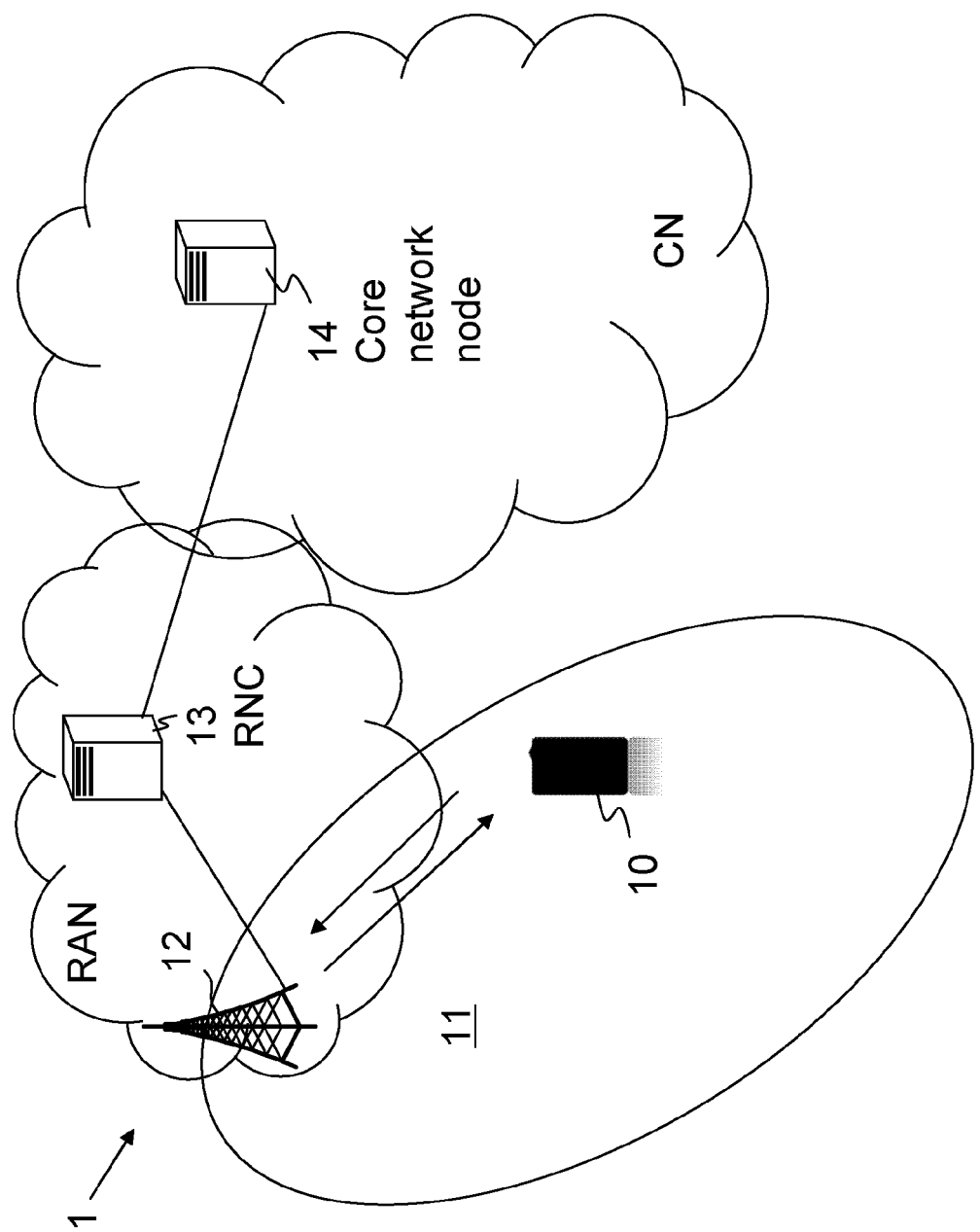
FIG. 1 is a schematic overview depicting a radio communications network according to embodiments herein.

FIG. 1 is a schematic overview depicting a radio communications network 1. The radio communications network may comprise LTE, LTE-Advanced, WCDMA, Global System for Mobile communications/Enhanced Data rate for GSM Evolution (GSM/EDGE), Worldwide Interoperability for Microwave Access (WiMax), Code Division Multiple Access 2000 (CDMA2000) or Ultra Mobile Broadband (UMB) or similar.

A user equipment 10 is served in a cell 11 of the radio communications network 1. It should be understood by the skilled in the art that "user equipment" is a non-limiting term which means any wireless terminal, device or node e.g. Personal Digital Assistant (PDA), laptop, mobile, Machine Type Communication (MTC) device, sensor, relay, mobile tablets or even a small base station communicating within the cell 11.

The radio communications network 1 comprises a radio base station 12 providing radio coverage over at least one geographical area forming the cell 11. The user equipment is thus served by the radio base station 12 and communicates with the radio base station 12. The user equipments transmit data over an air interface to the radio base stations in uplink (UL) transmissions and the radio base stations transmit data to the user equipments in downlink (DL) transmissions. The radio base station 12 may also be referred to as e.g. a NodeB, an evolved Node B (eNB, eNode B), a base transceiver station, Access Point Base Station, base station router, or any other network unit capable of communicating with a user equipment within the cells served by the radio base station 12 depending e.g. on the radio access technology and terminology used. A cell is a geographical area where radio coverage is provided by the radio base station equipment at a base station site or an antenna site in case the antenna and the radio base station are not collocated. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole mobile network is also broadcasted in the cell 11. The radio base station 12 communicates over the air or radio interface operating on radio frequencies with the user equipment 10 within range of the radio base station 12. The user equipment 10 transmits data over the radio interface to the radio base station 12 in uplink (UL) transmissions and the radio base station 12 transmits data over an air or radio interface to the user equipment 10 in downlink (DL) transmissions.

The illustrated radio communications network 1 further comprises a radio network controller (RNC) 13 controlling the radio base station 12. The term RNC should here not be interpreted too strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realized in the Base Station Controllers (BSC) of the CDMA 2000 network. In this document it is sometimes referred to an evolved RNC with expanded functionality in the UMTS architecture. It may also be envisioned that the traditional and/or expanded radio network control functionality may be distributed to two nodes, wherein one of them is responsible for the control plane part and the other one is responsible for the user plane part, and where the user plane node typically is controlled by the control plane node. Although the UMTS architecture is the primary target for the RNC concept, it is possible that it may be introduced in the EPS architecture too, thereby expanding the current EPS architecture which lacks a radio controller node, with a radio network controller such as the RNC 13, referred to as EPS RNC in some embodiments below. In such a case it will more or less contain only new functionality, whereas the "traditional" RNC functionality will still be located in the radio base stations, as the standard EPS architecture stipulates. The evolved RNC, being a node which is assumed to contain an enhancing functionality, e.g. so-called "smart mobile broadband" functions, is one obvious candidate for housing a cache functionality mentioned in the background. Note that this does not preclude that downlink data from the cache passes the Gi/SGi interface, because it is also quite likely that a local core network gateway, GGSN/SGSN or PGW/Serving Gateway (SGW), may be implemented on the evolved RNC, albeit possibly with limited functionality.

The radio communications network further comprises a Core Network (CN) as opposed to a Radio Access Network (RAN) comprising the radio base station 12 and the RNC 13. The CN comprises one or more a core network nodes 14 such as a SGSN, a Mobility Management Entity (MME), SGW, GGSN, PGW or a different node caching data intended for the user equipment 10. The caching functionality may be added to the RNC 13, additionally or alternatively, and/or may be added to a separate node and/or a core network node.

According to embodiments herein the radio base station 12 and the RNC 13 are defined as radio network nodes; and the core network node 14 and also the RNC 13 are examples of a network node.

Embodiments herein disclose a way of cooperating a caching node in the radio communications network 1 and the user equipment 10, shifting traffic from high load to low load periods, e.g. in terms of resource block (LTE) or code (WCDMA/High Speed Packet Access (HSPA)) utilization. This is achieved by moving content delivery in time, by either delaying it or proactively delivering it to the user equipment 10 in advance, instead of delivering cached content on immediate request. Thus, by avoiding delivering the data on peak load periods the network resources required during peak load periods may be reduced, thus allowing a more relaxed peak load dimensioning of network resources. Delaying delivery of data obviously requires that the concerned data and application using it are delay tolerant. In terms of user experience, delayed data delivery cannot increase the QoE, but if handled properly, it may be performed without decreasing the QoE, or with an acceptable moderate decrease of the QoE. This kind of data delivery, i.e. utilizing low load periods, has been coined "lower than best effort" (LBE) service/delivery.

Embodiments herein overcome the inefficient paging of a user equipment 10 when e.g. the location of the user equipment 10 is unknown, by providing a new kind of paging, denoted "conditional paging", wherein the actual paging, for delivery of cached data, across the radio interface is executed in a cell only if a certain condition is fulfilled. This is especially efficient for low priority data intended to the user equipment, i.e. non-delay sensitive data such as Best Effort data or LBE data. For LBE data the condition may be that the cell load in the cell 11 is below a certain threshold or, conversely, that the available capacity in the cell is above a certain threshold. Embodiments herein result in that the user equipment 10 responds and the LBE data is delivered only in cells where the current load is below the threshold or, conversely, that the available capacity in the cell is above the threshold. Thus the LBE data delivery in conjunction with unknown location or cell serving the user equipment 10 is performed without wasting radio resources and user equipment resources in highly loaded cells and without unnecessarily missing LBE data delivery opportunities. For example, if the load in the cell is above a threshold the user equipment 10 will not be paged and the delivery of the data will be delayed until the load in the cell 11 is below the threshold.

In the further descriptions of embodiments herein there will frequently be references to a condition defined in relation to the load in a cell. It should be understood that such a condition may always be substituted by a condition defined in relation to the available capacity in the cell, wherein the available capacity may be measured as e.g. available (WCDMA) codes, interference margin and/or transmission power headroom in UMTS or available resource blocks in LTE.

Figure 2:
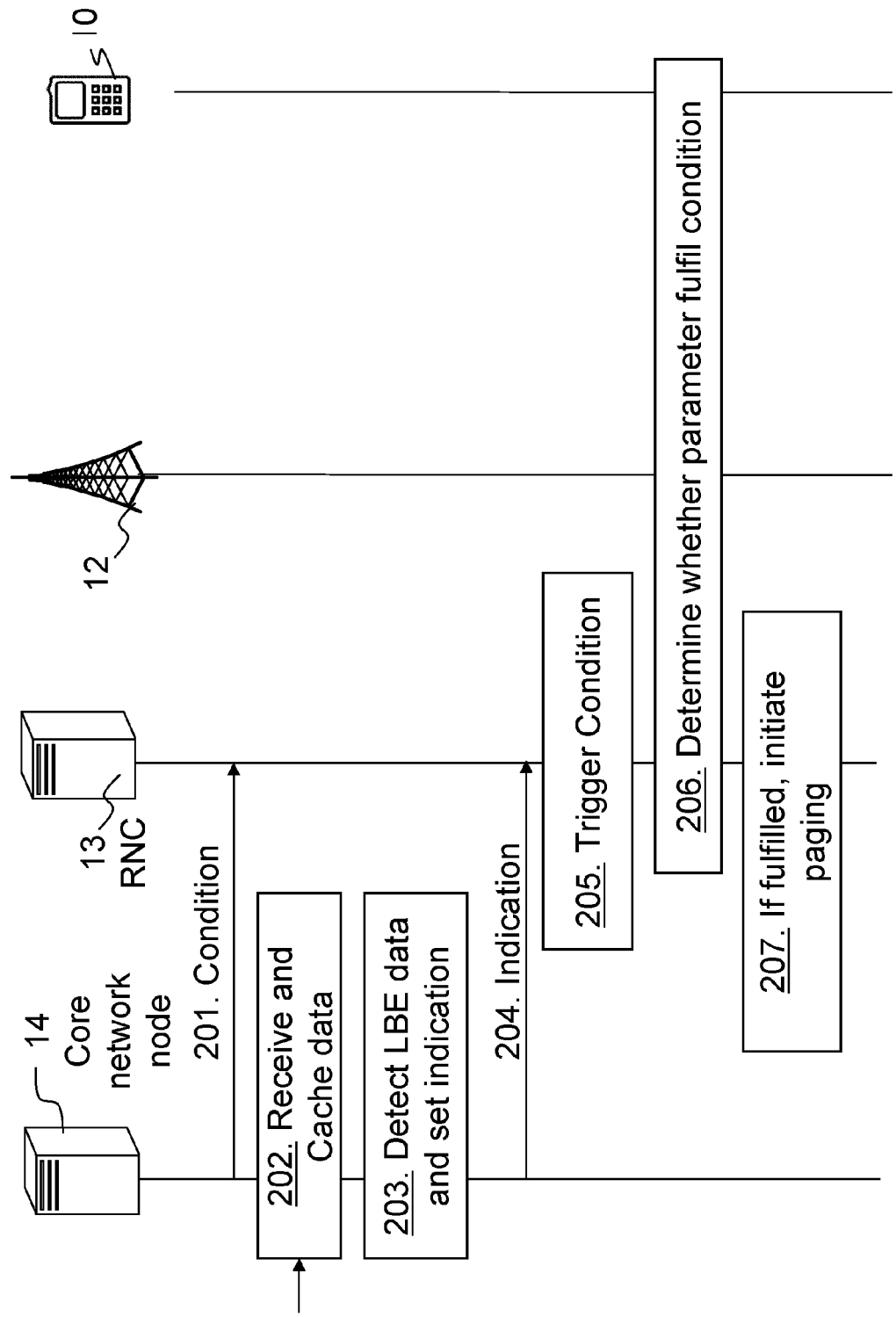
FIG. 2 is a combined flowchart and signalling scheme according to some embodiments herein.

FIG. 2 is a combined flowchart and signalling scheme in the radio communications network according to some embodiments herein. In this example data intended to the user equipment 11 is cached in the core network node 14 and the RNC 13 is configured to determine whether a condition associated with the cell 11 is fulfilled or not. It should however be understood that in other embodiments the radio base station 12 or a network node controller in the RAN may determine whether the condition is fulfilled or not depending on the network structure and/or the technology used.

Action 201.

The core network node 14 may transmit the condition to the RNC 13. However, the condition or conditions may be configured from anywhere to the RNC 13 or in embodiments not shown to the radio base station 12.

Action 202.

The core network node 14 receives data intended for the user equipment 11. The data is of a lower priority such as LBE data e.g. non-invasive test traffic data, or backup of data that need to be performed continuously throughout the day but not time relevant or other delay insensitive data such as certain subscribed media content.

Action 203.

The core network node 14 detects that the data is LBE data and sets an indication associated with the data, indicating that the data is LBE data. For example, the core network node 14 may map the data to a bearer indicated as a bearer of LBE data or may send explicit indicate in a message that the data is LBE data.

Action 204.

The core network node 14 transmits the indication to the RNC 13 to trigger the RNC 13 to initiate the use of the condition. LBE data delivery and consequent conditional paging may be indicated in different ways. The cache functionality in the core network node 14 may inject the data on a bearer dedicated for LBE data, e.g. indicated by a Quality of Service Class Indicator (QCI) value for a new Quality of Service (QoS) class. This may be done in the GGSN/PGW, via the Gi/SGi interface, the SGSN/MME/SGW or the evolved RNC 13. If the data is not explicitly associated with an LBE indication, such as through a dedicated LBE bearer, the cache functionality provides the relevant control plane node(s), i.e. the (evolved) RNC 13, the SGSN or the MME with a reference to be able to identify the arriving downlink data which is to be subject to conditional paging. This reference may be the International Mobile Subscriber Identity (IMSI) of the destination user equipment or a parameter derived from the first byte(s) of the downlink LBE data.

In some alternatives, an explicit indication of conditional paging or the actual paging condition may be included in a message. This may be considered for the PAGING RANAP message (UMTS), the PAGING TYPE 1 Radio Resource Control (RRC) message (UMTS), the PCH DATA FRAME of the Iub Frame Protocol (UMTS), or the PAGING S1AP message (EPS).

Action 205.

The RNC 13, when receiving the indication, triggers the usage of the condition to determine whether to page the user equipment 10 or not.

Action 206.

The RNC 13 determines whether the condition is fulfilled. For example, the condition may be related to a load in the cell 11. The decision to initiate a conditional paging procedure, which means whether a paging procedure with a condition should be applied or not, may depend on the situation in multiple cells, i.e. the cells that the user equipment 10 may currently be located in, such that the conditional paging procedure is initiated only if the condition is fulfilled in at least a certain fraction of the potential cells, wherein a potential cell is a cell that potentially serves the user equipment 10, wherein a potential cell is a cell that potentially serves the user equipment 10. For instance, the conditional paging, for the purpose of LBE delivery, may be used if the cell loads in a certain fraction of the potential cells are below the threshold or if at least one of the potential cells has sufficiently low load or if at least a fraction of the potential cells have available capacity above a capacity threshold or if at least one of the potential cells have available capacity above the threshold. The purpose of optionally using a condition for initiating the conditional paging procedure is to ensure that conditional paging procedures are initiated only when it is assessed to be sufficiently high probability that the user equipment 10 turns out to be located in a cell with low load and that the conditional paging thus is successful. This option may serve to reduce the number of unsuccessful conditional paging procedures. Note that the optional condition for initiating a conditional paging procedure should not be confused with the cell load condition applied for each cell when determining on a per cell basis whether or not to page the UE in the cell during a conditional paging procedure. A cell load condition may be expressed in terms of absolute cell load or relative cell load, where the latter implies a value that indicates the utilized fraction of the cell's maximum capacity. The aspect or property to associate with the cell load concept may be total carried throughput, number of connected UEs, number of radio bearers, code utilization (WCDMA/HSPA), resource block utilization (LTE) or any other aspect/property that may serve as a measure of the load in a cell. Similarly, a condition related to the available capacity in a cell may be expressed in absolute or relative terms, wherein the latter implies a value that indicates the fraction of the cell's total capacity that is still available. The aspect or property to associate with available capacity when expressing such a condition may be e.g. available (WCDMA) codes, interference margin and/or transmission power headroom in UMTS or available resource blocks in LTE.

Action 207.

When the condition is fulfilled for the cell 11, the RNC 13 pages the user equipment 10 in the cell 11. The final decision, based on the cell load, whether to page the user equipment 10 in the cell 11 is the responsibility of the RNC 13.

Embodiments herein introduce a paging, denoted "conditional paging", wherein the actual paging across the radio interface is executed in the cell 11 only if a certain condition is fulfilled. In the context of e.g. LBE data delivery the condition may be a cell load threshold, but the concept may be generalized to other types of condition, e.g. related to the energy saving state of the cell 11 e.g. 'active', 'sleeping' or 'semi-sleeping', environment, e.g. indoor or outdoor, geographical location/area of the cell, etc. The type of the cell may also be considered, e.g. pico, macro, femto cells, e.g. such that only the load in the potential macro cells are considered when determining whether to initiate the conditional paging procedure. Time related conditions may also be utilized, e.g. such that at certain minimum time interval has to elapse after a failed (unanswered) conditional paging procedure before the next conditional paging procedure concerning the same LBE data may be initiated.

Figure 3:
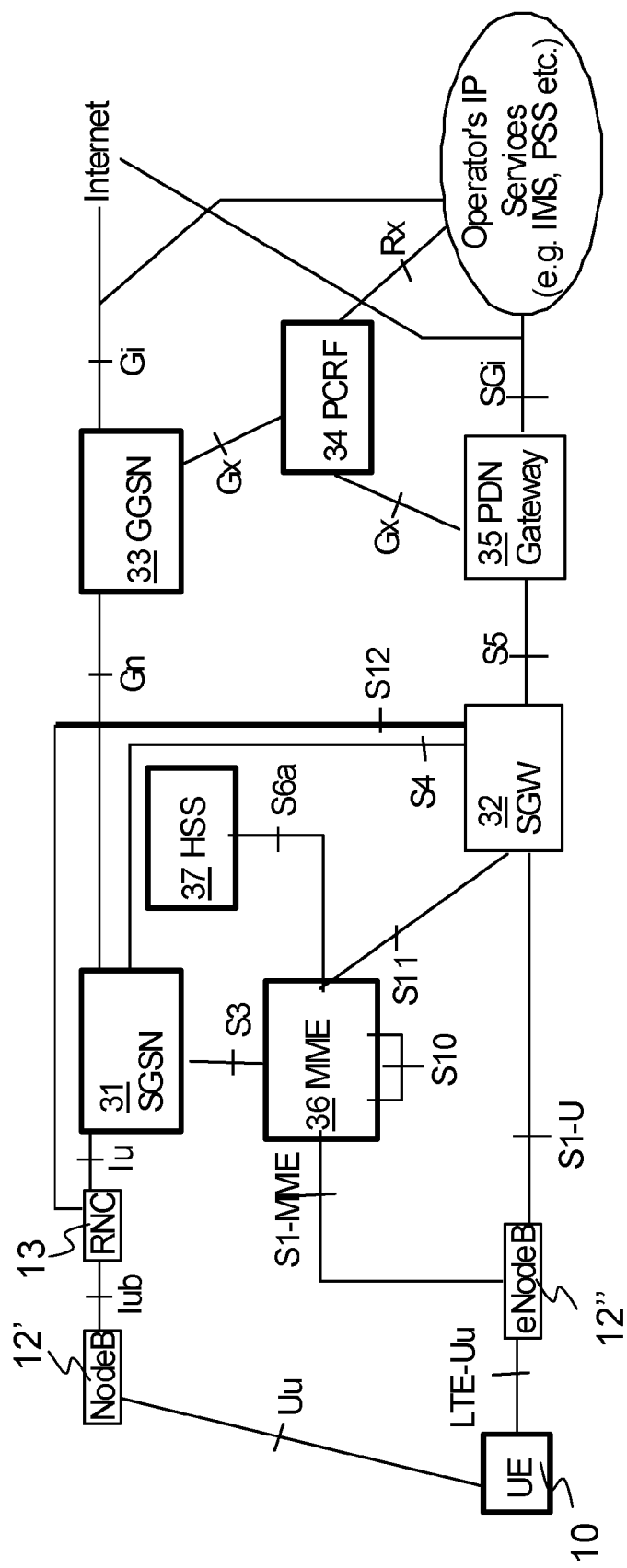
FIG. 3 is a schematic overview depicting a radio communications network according to embodiments herein.

Many details of the conditional paging mechanism differ between UMTS and EPS, also referred to as LTE. Therefore the further description is divided into a section for UMTS and a section for EPS. FIG. 3 is block diagram depicting a radio communications network comprising EPS and UMTS nodes, the non-roaming case, for a better overview of the different networks.

In the illustrated example, the user equipment 10 is communicating with a radio base station 12', a NodeB, in the UMTS network over a Uu interface. The user equipment 10 may further be communicating with a radio base station 12", an eNodeB, in the EPS over a LTE-Uu interface. In the UMTS network the radio base station 12' is connected to the RNC 13 over an Iub interface. The RNC 13 may be defined as an Evolved RNC when comprising a cache functionality. The RNC 13 is in its turn connected to a SGSN 31 but also a SGW 32. The SGSN 31 is further connected to a GGSN 33. The GGSN 33 is connected to the Internet and a Policy Charging and Rules Function (PCRF) node 34. The PCRF node 34 in its turn is connected to a PGW 35 but also to the Operators IP services, such as IP Multimedia Subsystem (IMS), Packet Switched Streaming (PSS), etc. The radio base station 12" of the LTE network is further connected to a MME 36 and the SGW 32. The MME 36 is connected to a Home Subscriber Server (HSS) 37. There are a lot of different interfaces between the different nodes such as Iu, Gn, Gi, S3, S6a, S4, S12, Gx, S1-MME, S10, 511, Rx, 51-U, S5, SGi etc. The description below is related to paging in UMTS and EPS, when the user equipment 10 is paged in multiple cells, because the radio communications network 1 does not know exactly in which cell the user equipment 10 is located. In UMTS the user equipment's cell is unknown when the user equipment 10 is in Packet Mobility Management (PMM)-IDLE state, and has no RRC connection for Circuit Switched (CS), wherein the user equipment's location is known with the accuracy of a Routing Area (RA) and when the user equipment 10 is in UTRAN Registration Area Paging Channel (URA-PCH) state, wherein the user equipment's location is known with the accuracy of a UTRAN Registration Area. The former is a UE-CN related state and in that case the paging procedure is initiated from the SGSN 31. The latter is a UE-RAN related state and in that case the paging procedure is initiated from the RNC 13.

When the user equipment 10 is in PMM-IDLE state the SGSN 31 initiates the paging procedure when downlink data is pending for the user equipment 10. The SGSN 31 then sends a PAGING Radio Access Network Application Part (RANAP) message to the RNC 13, or RNCs if the current Routing Area (RA) of the user equipment 10 spans multiple RNCs. Among other parameters the PAGING RANAP message includes the IMSI of the user equipment 10 and an indication of the user equipment's current RA. The RNC 13 then pages the user equipment 10 in the cells belonging to the indicated RA and the user equipment 10 responds to the page by contacting the radio communications network for an RRC connection establishment and a Service Request Non-Access Stratum (NAS) message to the SGSN 31. The RNC 13 may send two types of paging messages, both of which are RRC messages: PAGING TYPE 1 message and PAGING TYPE 2 message. Only the PAGING TYPE 1 message is relevant in conjunction with embodiments herein. When paging a user equipment which does not already have an established RRC connection, the RNC 13 broadcasts a PAGING TYPE 1 RRC message in each of the cells included in the user equipment's current RA. Each of these PAGING TYPE 1 RRC messages is conveyed across the Iub interface in two PCH DATA FRAMEs of the Iub Frame Protocol. Iub interface being the interface between the RNC 13 and the radio base station 12. Note that the transfer of a PAGING TYPE 1 RRC message across the Iub interface is targeting a single cell, which means that if multiple cells in a radio base station 12 are included in the targeted RA, which is the typical case, multiple PAGING TYPE 1 RRC messages, one for each cell, will be transferred across the Iub interface to the radio base station 12. When receiving a PAGING TYPE 1 RRC message, the radio base station 12 forwards it on the Paging Control Channel (PCCH) in the destination cell. However, in embodiments herein this is only performed when a condition associated with the cell 11 is fulfilled.

In EPS the user equipment's current cell is unknown when the user equipment 10 is in idle mode, i.e. RRC-IDLE state and EPS Connection Management (ECM)-IDLE state. The UE's location is then known to the radio communications network 1 with the accuracy of a list of Tracking Areas (TA). Paging in EPS is initiated from the core network, typically triggered by arrival of downlink user data. The user data to be delivered is buffered in e.g. the SGW 32, which sends a Downlink Data Notification GTPv2-C message to the MME 36. Thus, a Downlink Data Notification GTPv2-C message may be used by the SGW 32 to notify the MME 36, which in turn initiates the conditional paging procedure and sends the indication to the radio base stations. GTPv2-C being the control plane part of the GPRS Tunneling Protocol (GTP) version 2. The MME 36 checks which radio base stations that have cells belonging to any of the TAs whose Tracking Area Identities (TAI) are included in the user equipment's current TAI list and sends a PAGING S1AP message across the S1 interface to each of these radio base stations, requesting e.g. the radio base station 12 to page the user equipment 10 in all cells belonging to any of the concerned TAs, i.e. all cells having a TAI that is included in the user equipment's list of TAIs. The PAGING S1AP message includes, among other parameters, IMSI Modulo 1024 in the UE Identity Index Value IE, the user equipment's list of TAIs in the List of TAIs IE. The radio base station 12 receiving the PAGING S1AP message then pages the user equipment 10 in the concerned cells, i.e. the cells having a TAI that is included in the user equipment's list of TAIs, and the user equipment 12 responds to the page by contacting the network for an RRC connection establishment and a Service Request NAS message to the MME. However, this is only performed when the condition is fulfilled according to embodiments herein.

UMTS

PMM-IDLE State

There are different approaches to how to realize the conditional paging feature in UMTS when the user equipment 10 is in PMM-IDLE state. They are described below.

UMTS PMM-IDLE State Method 1: Interception of Regular Paging in the Network Node Such as the RNC 13 or the Core Network Node 14

With this approach the cache functionality, i.e. the caching of the data intended e.g. for the user equipment 10, injects the LBE data through the Gi interface and then the core network handles it like any other data. That is, the GGSN 33 uses packet filters to map the data to a bearer, e.g. a best effort bearer associated with the primary Packet Data Protocol (PDP) context of the user equipment 10, and forwards the LBE data to the SGSN 31. An alternative bearer could be a specific bearer for LBE traffic, where the LBE property would be indicated through a new QCI value, i.e. a new QoS class. The arrival of downlink data triggers the SGSN 31 to send a PAGING RANAP message to the RNC 13, which among other data contains the IMSI of the user equipment 10, to initiate paging of the user equipment 10 in its current RA.

The cache functionality also informs the RNC 13 that it sends LBE data to the user equipment 10 over the Gi interface and indicates the IMSI of the user equipment 10 to the RNC 13. This informing may be in the form of a response to a request from the RNC 13 to transfer LBE data to the user equipment 10 e.g. up to a certain volume or at a certain maximum rate, but it may also be an unsolicited indication. It is possible that the cache functionality is implemented as a part of the RNC 13, in which case this communication becomes internal communication between different functional entities in the RNC 13.

The RNC 13 receives the PAGING RANAP message from the SGSN 31 and checks the IMSI that is included in the message. When the IMSI in the message is equal to the one indicated by the cache functionality, the RNC 13 converts the regular paging to conditional paging. The RNC 13 has reasonably good and up to date information about the load in the cells and may thus by itself determine which cells to page the user equipment 10 in. Alternatively, the RNC 13 may delegate the decision to the radio base station 12, by including an indication of the condition in the PAGING TYPE 1 RRC message(s) or in the Iub Frame Protocol frames carrying the PAGING TYPE 1 RRC message across the Iub interface to the radio base station 12, e.g. the spare extension field in the PCH DATA FRAME may be utilized, or in a new Node B Application Part (NBAP) message. Two consecutive PCH DATA FRAMEs are transmitted to page one UE. The first frame contains the paging indication information and the second contains the paging message. If the PAGING TYPE 1 RRC message or the PCH DATA FRAME is used, the indication should be included in each of the multiple transfers to a radio network node, i.e. for each of the targeted cells. For each received message transfer the radio base station 12 extracts the indication, applies the condition per cell, which thus enables different conditions to be applied for different cells, and forwards the PAGING TYPE 1 RRC message, without the indication, on the PCCH of each cell whose condition is met. If a new NBAP message is used, the indication, the PAGING TYPE 1 RRC message and a list of the cells to, conditionally, page the user equipment 10 in may be included in a single NBAP message, requesting the radio base station 12 to apply the condition to all the cells listed in the message and to forward the PAGING TYPE 1 RRC message in the cells where the condition is met.

The indication in the message, whether it is the PAGING TYPE 1 RRC message, a PCH DATA FRAME of the Iub Frame Protocol or the NBAP message, may comprise a single bit indicating whether a preconfigured load condition should be applied or it may be a multi-bit index pointing into a table of multiple different load conditions or it may be an explicit load value.

In some unusual cases this scheme may fail to perform well. This is when other downlink data to the user equipment 10 happens to more or less coincide with the transfer of the LBE data. In this case the RNC 13 may mistakenly consider a PAGING RANAP message triggered by regular downlink data as a PAGING RANAP message for conditional paging and consequently incorrectly convert it into a conditional page. The probability for these events is however low and they should therefore be very rare, leading to the conclusion that this disadvantage is outweighed by the benefits of the conditional paging feature.

Nevertheless, a possible way to eliminate the disadvantage would be to introduce a new parameter in the PAGING RANAP message containing what could be called an identification signature of the page-triggering downlink data, e.g. one or two bytes of the pending downlink data or a hash, or a Cyclic Redundancy Check (CRC) calculation, of a certain number of the first bytes of the pending downlink data that triggered the PAGING RANAP message. The data bits used as the basis for identification of the page-triggering downlink data, as plain data bits or as input to a hash or CRC calculation, should preferably not be taken from the fairly static parts of the IP header or transport layer protocol, e.g. TCP or UDP, header. Data bytes from the more dynamic parts of the headers or from the payload of the transport layer packet are preferable, since they would produce a more unique identification signature of the downlink data. The cache functionality would provide the RNC 13 with the same information, together with the IMSI of the user equipment 10, so that the RNC 13 can verify that a PAGING RANAP message containing the concerned IMSI was indeed triggered by the LBE data. Furthermore, if the SGSN 31 and the PAGING RANAP message are anyway affected, and if a dedicated bearer for LBE data is used, then it may be better to introduce an explicit indication of conditional paging, e.g. as a new parameter or as a dedicated value of the Paging Cause IE, in the PAGING RANAP message, thereby eliminating the need for a reference altogether.

UMTS PMM-IDLE State Method 2: The Cache Functionality Triggers the SGSN 31 to Initiate Conditional Paging With this approach the cache functionality triggers the SGSN 31 to initiate conditional paging for the user equipment 10. In order for the RNC 13 to know that the paging is conditional a new parameter is introduced in the PAGING RANAP message to indicate the condition, unless the Paging Cause IE can be reused for this purpose. As above, there are several conceivable representation formats for the condition indication in the message, e.g. flag, table index or explicit load value, providing different granularity and flexibility. An alternative to the new parameter or a dedicated value of the Paging Cause IE, in the PAGING RANAP message is to use IMSI matching in the same manner as described for UMTS PMM-IDLE state method 1 above, where anyway, in contrast to the solution alternative UMTS PMM-IDLE state method 1 above, both the SGSN 31 and the RNC 13 will be affected. In any case the RNC 13 would execute the conditional paging as described for UMTS PMM-IDLE state method 1.

The LBE data flow from the cache may be injected, on a suitable bearer as in UMTS PMM-IDLE state method 1 above, in the SGSN 31, the GGSN 33, over the Gi interface, or the RNC 13.

Triggering the SGSN 31 will be simplified if the cache functionality is integrated in the SGSN 31. Such a deployment scenario also seems to favour injecting the LBE data in the SGSN 31, thus, the network node may comprise the SGSN 31.

Another potentially attractive implementation/deployment option could be to integrate the cache functionality in an evolved RNC, together with a local GGSN/SGSN. This would give the cache functionality convenient access to both the SGSN 31, for triggering of conditional paging, and the GGSN 33, for LBE data injection across the Gi interface.

UMTS PMM-IDLE State Method 3: The Cache Triggers the RNC 13 or Core Network Node 14 to Initiate Conditional Paging With this approach the cache functionality retrieves information about the user equipment's current RA from the SGSN 31. The cache functionality then requests the RNC 13 to perform conditional paging and, immediately or after a received page response, injects the LBE data on a best effort bearer or a bearer dedicated for LBE data in the RNC 13.

Note that an option for the LBE data injection may be that the cache functionality simply gives an amount of LBE data to the RNC 13, e.g. as a response to a request from the RNC 13 for a certain amount of LBE data, and the RNC 13, knowing that this is LBE data, and thus also knowing that conditional paging should be applied, injects the LBE data on a suitable bearer, e.g. a best effort bearer.

A disadvantage of this approach is that a core network functionality, e.g. charging and lawful interception, is bypassed.

URA-PCH State

There are different approaches to how to realize the conditional paging feature in UMTS when the user equipment 10 is in URA-PCH state. Different examples are given below.

UMTS URA-PCH State Method 1: Injecting the LBE Data Across the Gi Interface (Preferred Approach)

This solution alternative has obvious similarities with UMTS PMM-IDLE state method 1. The cache functionality injects the LBE data across the Gi interface and the core network handles it like any other data. That is, the GGSN 33 uses packet filters to map the data to a bearer, e.g. a best effort bearer associated with the primary PDP context of the user equipment 10, and forwards the LBE data to the SGSN 31, which in turn forwards it to the RNC 13, unless direct tunneling is applied, in which case the LBE data is forwarded directly from the GGSN 33 to the RNC 13. An alternative bearer could be a specific bearer for LBE traffic, where the LBE property would be indicated through a new QCI value, i.e. a new QoS class.

When the LBE data arrives at the RNC 13, the RNC 13 executes conditional paging of the user equipment 10 as described in conjunction with UMTS PMM-IDLE state method 1, the only difference being that the conditional paging is performed in the user equipment's current UTRAN Registration Area (URA) instead of in a RA.

If the LBE data arrives to the RNC 13 on a bearer dedicated for LBE data, e.g. indicated by a certain QCI value, it is obvious to the RNC 13 that it should perform conditional paging of the user equipment 10 instead of regular paging. However, if the other bearer alternative, i.e. injecting the LBE data on a regular best effort bearer is implemented, then the RNC 13 needs more information in order to know whether it should perform regular or conditional paging. In such a case the cache functionality should inform the RNC 13 that it sends LBE data to the user equipment 10 over the Gi interface and indicate the IMSI of the UE to the RNC, so that the RNC 13 may perform IMSI matching in the same way as described for UMTS PMM-IDLE state method 1.

Complementing the IMSI matching with an identification signature of the page-triggering downlink data, as described for UMTS PMM-IDLE state method 1 is a possible option with this method too.

Integrating the cache functionality in the RNC 13 together with a local GGSN/SGSN, or only GGSN, would probably be a convenient implementation alternative for this solution.

UMTS URA-PCH State Method 2: Injecting the LBE Data in the RNC 13

With this approach the cache functionality only interacts with the RNC 13, which it may also be a part of. Apart from that and that conditional paging is performed in a URA instead of in a RA, this solution alternative is similar to UMTS PMM-IDLE state method 3. Thus, the cache functionality requests the RNC 13 to perform conditional paging and, immediately or after a received page response, injects the LBE data on a best effort bearer or a bearer dedicated for LBE data in the RNC 13.

Note that an option for the LBE data injection may be that the cache functionality simply gives an amount of LBE data to the RNC 13, e.g. as a response to a request from the RNC 13 for a certain amount of LBE data, and the RNC 13, knowing that this is LBE data, and thus also knowing that conditional paging should be applied, injects the LBE data on a suitable bearer, e.g. a best effort bearer.

A disadvantage of this approach compared to UMTS URA-PCH state method 1 is that the core network functionality, e.g. charging and lawful interception, is bypassed.

EPS

With some modifications the alternative solution approaches for UMTS PMM-ILDE state described in section above, at least their respective basic principles, may be used also for EPS.

EPS Idle Mode

EPS Idle Mode Method 1: Interception of Regular Paging in a Radio Network Node, Such as an EPS RNC or the Radio Base Station 12.

This is the EPS version of UMTS PMM-IDLE mode method 1. However, there are two important differences between the UMTS and EPS architectures that affect this method:

In EPS there is no RNC 13 and currently the architecture does not contain any similar controller node either.

The PAGING S1AP message, which corresponds to the PAGING RANAP message, does not include the IMSI, but instead a UE Identity Index IE that contains the value IMSI Modulo 1024.

A radio network controller node, e.g. an EPS radio network controller node, to some extent similar to the RNC in UMTS, may however be deployed on proprietary basis in EPS networks. Although this can in no way be assumed, the existence of an EPS radio network controller node would be beneficial for this solution alternative. Then the lack of IMSI in the PAGING S1AP message is the only obstacle that has to be tackled. There are two straightforward approaches:

Rely on IMSI Modulo 1024 to identify the PAGING S1AP message related to the LBE data and accept that there is a small, but non-negligible risk for errors, which means that conditional paging will be performed, and page responses consequently sometimes missed, in some cases where regular paging should have been used.

Introduce the IMSI as a new parameter in the PAGING S1AP message and disregard the reasons for removing it in the first place. This would mean that the MME 36 is no longer free from impact of this solution alternative, which was an important advantage of UMTS PMM-IDLE method 1.

Another, less straightforward workaround would be to introduce another parameter to serve as reference between the LBE data and its corresponding PAGING S1AP message. This parameter could e.g. be X bits of the page-triggering LBE data or an X bit CRC of the first packet(s) of LBE data. As with case of the page-triggering downlink data identification signature described for UMTS PMM-IDLE state method 1 the more or less static parts of the IP and transport layer protocol headers should preferably be avoided when defining the data bits utilized for this purpose. This parameter would have to be calculated by the SGW 32 and conveyed to the MME 36 in the Downlink Data Notification GTPv2-C message, e.g. as a private extension, i.e. in the Private Extension IE. The MME 36 would then include it in the PAGING S1AP message to the EPS radio network controller node, which means that both the SGW 32 and the MME 36 would be impacted. As with the IMSI in UMTS PMM-IDLE method 1 the cache functionality would have to convey this new parameter, or the IMSI or IMSI Modulo 1024 if one of those parameters is used as the LBE data reference, to the EPS radio network controller node.

To make this method work for the case where there is no EPS radio network controller node in the EPS RAN, which is the most likely case, the cache functionality has to inform the concerned radio base station 12 of the LBE data transfer and the reference in the soon to be expected corresponding PAGING S1AP message. These radio base stations are derived from the user equipment's current Tracking Area list, which is stored in the UE context in the MME 36. The cache functionality may thus request the radio base station information from the MME 36 before informing the radio base stations.

As an alternative to retrieving radio base station information from the MME 36 the cache functionality may inform all the radio base stations that are connected to the MME 36, which would mean that many, probably most of the informed radio base stations will not receive the PAGING S1AP message.

Similar to what was described for UMTS PMM-IDLE state method 1 the cache functionality injects the LBE data through the SGi interface and then the core network handles it like any other data. That is, the PGW 35 uses packet filters to map the data to a bearer, e.g. a best effort bearer serving as the default bearer of the user equipment 10, and forwards the LBE data to the SGW 32. An alternative bearer could be a specific, dedicated bearer for LBE traffic, where the LBE property would be indicated through a new QCI value, i.e. a new QoS class. The arrival of downlink data triggers the SGW 32 to send a Downlink Data Notification GTPv2-C message to the MME 36, which triggers the MME 36 to initiate paging of the user equipment 10 in the Tracking Areas of the user equipment's current Tracking Area list, by sending a PAGING S1AP message to the radio network node, i.e. the radio base stations or the EPS radio network controller node, if such a node exists in the network.

If an EPS radio network controller node is deployed, then, as in UMTS PMM-IDLE state method 1, either the EPS radio network controller node or the radio base stations may determine, based on the current cell load, which cells to page the user equipment 10 in. And just as in UMTS PMM-IDLE state method 1, if the EPS radio network controller node delegates the decision to the radio base stations, the EPS radio network controller node has to include an indication of the paging condition in the PAGING S1AP message to the radio base stations, as a new parameter or possibly as a specific value of the Paging Priority IE. If there is no EPS radio network controller node, then the radio base stations determine based on the current cell load, which cells to page the user equipment 10 in.

EPS Idle Mode Method 2a: The Cache Functionality Triggers the MME 36 to Initiate Conditional Paging This solution alternative corresponds reasonably to UMTS PMM-IDLE state method 2. An important difference is however that in UMTS the SGSN 31 comprises both the control plane and the user plane, whereas in EPS these two planes are split between the MME 36 and the SGW 32. Hence there are two EPS solution alternatives that reasonably well correspond to UMTS PMM-IDLE state method 2: EPS idle mode method 2a, this solution alternative, wherein the cache functionality triggers the MME 36 to initiate conditional paging, and EPS idle mode method 2b (described below), wherein the cache functionality triggers the SGW 32 to trigger conditional paging.

Thus, with this approach the cache functionality triggers the MME 36 to initiate conditional paging for the user equipment 10. In order for the radio base station 12 to know that the paging is conditional a new parameter is introduced in the PAGING S1AP message to indicate the condition, or possibly a dedicated value of the Paging Priority IE could be allocated for this purpose. As previously described, there are several conceivable representation formats for the condition indication in the message, e.g. flag, table index or explicit load value, providing different granularity and flexibility. An alternative to the new parameter in the PAGING S1AP message is to use reference matching, i.e. using IMSI Modulo 1024, IMSI or a new reference parameter, in the same manner as described for EPS idle mode method 1. Just like in EPS idle mode method 1 this would require that the cache functionality either informs the concerned radio base station 12 based on radio base station information retrieved from the MME 36 or informs all the radio base stations connected to the MME 36. This seems like a less preferred method than introducing a condition indication in the PAGING S1AP message in this solution alternative, where anyway both the MME 36 and the radio base station 12 will be affected. In any case the radio base station 12, or possibly the EPS radio network controller node if such a node is deployed, would determine, based on the current cell load, which of their respective cells to page the user equipment 10 in.

The LBE data flow from the cache may be injected, on a suitable bearer as in EPS idle mode method 1, in the SGW 32 or the PGW 35, over the SGi interface.

EPS Idle Mode Method 2b: The Cache Functionality Triggers the SGW 32 to Trigger Conditional Paging As mentioned above in conjunction with EPS idle mode method 2a, this is one of the EPS solution alternatives that reasonably well corresponds to UMTS PMM-IDLE state method 2.

With this approach the cache functionality triggers the SGW 32 to trigger conditional paging of a UE. There are several ways to achieve this.

One way is that the cache functionality injects the LBE data in the PGW 35, via the SGi interface, on a bearer that is dedicated for LBE data, e.g. indicated with a QCI value for a new QoS class. When the SGW 32 receives the downlink data on the bearer that is dedicated for LBE data, it sends a Downlink Data Notification GTPv2-C message to the MME 36, including an indication that conditional paging should be used. This indication may be included in the Private Extension IE, or possibly a dedicated value of the Allocation/Retention Priority IE may serve this purpose. The rest of the method is equal to EPS idle mode method 2a. This is the preferred way to realize this solution alternative.

Another way is that the cache functionality injects the LBE data on a suitable bearer in the SGW 32 and concurrently informs, either explicitly or implicitly through the use of a dedicated LBE bearer, the SGW 32 that conditional paging should be used. As above, the SGW 32 then sends a Downlink Data Notification GTPv2-C message to the MME 36, including an indication that conditional paging should be used. This indication may be included in the Private Extension IE (or possibly a dedicated value of the Allocation/Retention Priority IE may serve this purpose). The rest of the method is equal to EPS idle mode method 2a.

Yet another way is that the cache functionality injects the LBE data in the PGW 35, via the SGi interface, on a bearer that is not dedicated for LBE data, e.g. a best effort bearer, assumedly the default bearer, and informs the SGW 32 of the IMSI of the concerned user equipment 10, and possibly the identity of the bearer that the LBE data is injected on, so that the SGW 32 knows that when downlink data arrives on this UE's best effort bearer, it should trigger conditional paging. As above, the SGW 32 then sends a Downlink Data Notification GTPv2-C message to the MME 36, including an indication that conditional paging should be used. This indication may be included in the Private Extension IE, or possibly a dedicated value of the Allocation/Retention Priority IE may serve this purpose. The rest of the method is equal to EPS idle mode method 2a.

Yet another way is to not introduce an indication of conditional paging in the Downlink Data Notification GTPv2-C message, but instead the cache functionality informs the MME 36 of the IMSI of the user equipment 10 for which downlink LBE data, and consequently conditional paging, is imminent, so that the MME 36 may match this with the IMSI that is associated with the Downlink Data Notification GTPv2-C message, based on the GTP Tunnel endpoint identifier (TEID) of the GTP tunnel that the Downlink Data Notification GTPv2-C message is sent through. The LBE data may be injected on a suitable bearer in either the PGW 35, via the SGi interface which is preferred, or in the SGW 32. The rest of the method is equal to EPS idle mode method 2a.

EPS Idle Mode Method 3: The Cache Triggers the RNC 13 to Initiate Conditional Paging This solution alternative corresponds to UMTS PMM-IDLE state method 3 and assumes that an EPS radio network controller node is deployed in the EPS network.

With this approach the cache functionality retrieves information about the UE's current Tracking Area list from the MME 36. The cache functionality then requests the EPS radio network controller node to perform conditional paging and, immediately or after a received page response, injects the LBE data on a best effort bearer or a bearer dedicated for LBE data in the EPS radio network controller node.

Note that an option for the LBE data injection may be that the cache functionality simply gives an amount of LBE data to the EPS radio network controller node, e.g. as a response to a request from the EPS radio network controller node for a certain amount of LBE data, and the EPS radio network controller node, knowing that this is LBE data, and thus also knowing that conditional paging should be applied, injects the LBE data on a suitable bearer, e.g. a best effort bearer.

The cache functionality may withhold the actual delivery of LBE data from the cache until a response to the conditional paging is received. That is, first the conditional paging is triggered, then, if a page response is received, the cache functionality is informed and the LBE data is delivered, e.g. by injecting it on a suitable bearer. This variation avoids that LBE data is dropped or buffered elsewhere in the radio communications network 1, in case of unsuccessful, i.e. unanswered, conditional paging.

In UMTS URA-PCH state method 1 and 2, mentioned above, the cache functionality may actually be unaware of the cases of failed conditional paging. The RNC 13, or evolved RNC, may determine that the situation is potentially suitable for LBE data delivery and go on to conditionally page the user equipment 10. If the user equipment 10 responds, the RNC 13, or evolved RNC, may request the cache functionality to deliver LBE data, whose presence in the cache the RNC 13, or evolved RNC, has previously been informed of, either by injecting it on a suitable bearer in the RNC 13, or evolved RNC, or the GGSN 33 or by simply passing it to the RNC 13, or evolved RNC, in the response to the request. Note that no reference is needed when injecting data, since the conditional paging has already been performed.

Another possible addition or option is that the outcome of the conditional paging, in terms of success or failure, may be fed back to the cache functionality. This feedback could come from the RNC 13, or evolved RNC, or another node, depending on which network nodes the cache functionality interacts with.

Embodiments herein provide an efficient way to handle delivery of time-shifted low priority, "lower than best effort", cached data when the cell of the destination user equipment 10 is unknown. Embodiments herein assure that the lower than best effort data is delivered only when the load in the cell the user equipment 10 is located in is low; the lower than best effort data is delivered without wasting radio resources and UE resources in highly loaded cells and without unnecessarily missing lower than best effort data delivery opportunities, even when the exact cell of the user equipment 10 is unknown. This is applicable to both EPS/ LTE and UMTS/WCDMA/HSPA and potentially other cellular systems too.

Furthermore, one could consider the load in all potential paging cells to be monitored and the user equipment 10 is paged, and the LBE data delivered, only if the load is low enough in all potential cells i.e. each cell in the paging area has to fulfill a load criterion. This ensures that the LBE data is delivered only when the cell load is low, i.e. below a certain threshold. The downside is that the potential opportunities to deliver the LBE data will be significantly reduced, since the times when the load is low in all potential cells simultaneously are fewer than the times the load is low in each single cell.

The user equipment 10 may be paged in all potential cells irrespective of the load of each particular cell, possibly triggered by detection of sufficiently low load in a certain number or fraction of the potential cells. However, when the user equipment 10 responds and its current cell becomes known, the LBE data is delivered only if the load in this cell is below the predefined threshold. With this approach no or few LBE data delivery opportunities are missed, but on the other hand radio resources and resources in the user equipment 10 are wasted when the user equipment 10 is paged and the user equipment responds in a too loaded cell, resulting in the whole procedure being in vain, because no LBE data is delivered.

According to some embodiments herein a system for paging the user equipment 10 in the radio communications network 1 is provided. The user equipment 10 is configured to be served in the cell 11 of the radio communications network 1. The radio network node is configured to control the cell 11 and is connected to the network node in the radio communications network 1. The network node is configured to set an indication indicating that paging of the user equipment 10 is only to be performed when a condition is fulfilled. The condition is associated with the cell 11. The network node is further configured to transmit the indication to the radio network node controlling the cell 11 in the radio communications network 1. Then, the radio network node is configured to determine whether the condition is fulfilled; and, when the condition is fulfilled, the radio network node is configured to page the user equipment 10 in the cell 11.

Figure 4:
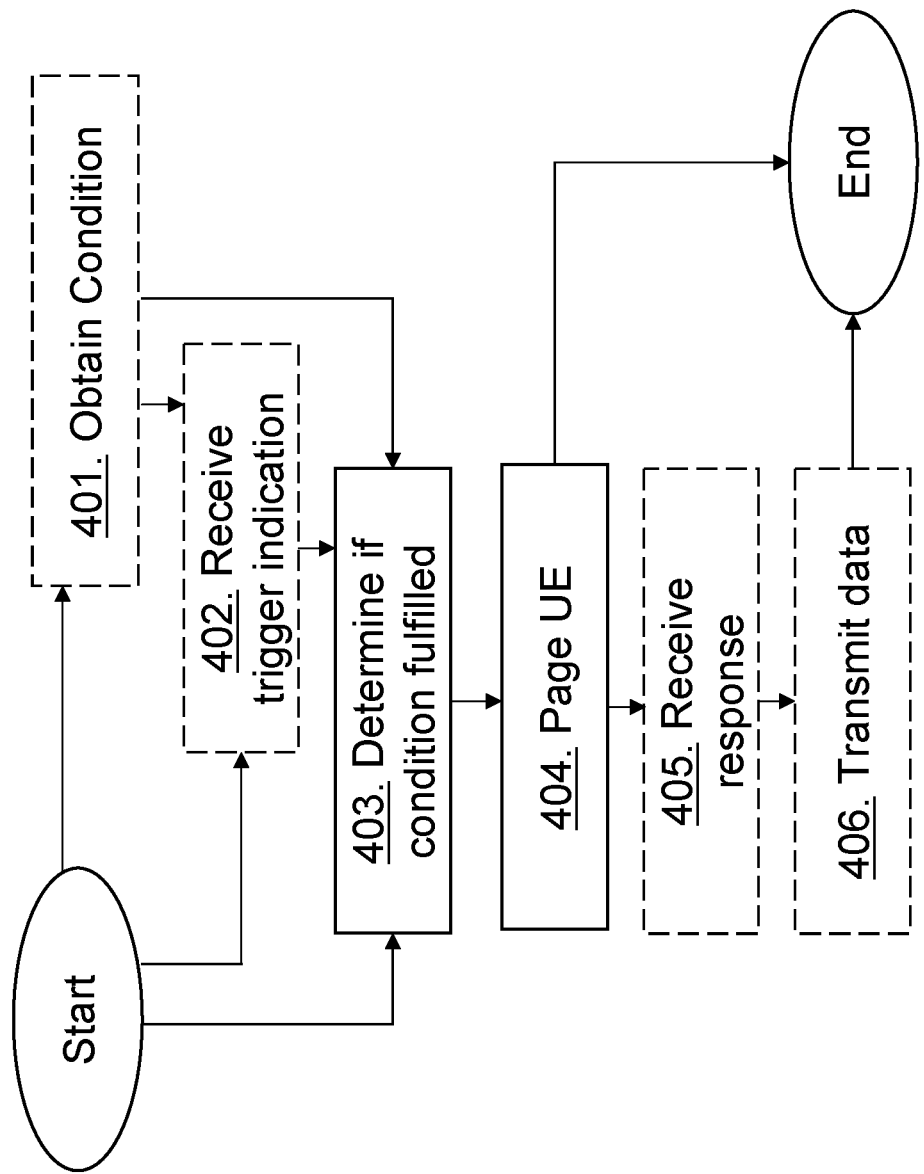
FIG. 4 is a schematic flow chart depicting a method in a radio network node according to embodiments herein.

The method actions in the radio network node, referred to as radio base station 12 and radio network controller 13 in the figures, for paging the user equipment 10 in the radio communications network 1 according to some embodiments will now be described with reference to a flowchart depicted in FIG. 4. The actions do not have to be taken in the order stated below, but may be taken in any suitable order. Actions performed in some embodiments are marked with dashed boxes. The radio network node serves the cell 11 in the radio communications network 1. The data to be sent to the user equipment 10 may be data of a best effort quality requirement or lower than the best effort quality requirement.

Action 401.

The radio network node obtains the condition from the network node, an Operation and Maintenance (O&M) node or from within the radio network node. E.g. the condition may be configured in the radio network node from an O&M node at installation and possibly at later occasions and when the radio network node is to actually use the condition, it retrieves it from its internal storage, thus, obtaining it from within the radio network node.

Action 402.

The radio network node may receive an indication from the network node triggering the use of the condition when determining whether the condition is fulfilled in action 403. The indication may be that data is received on a bearer with a quality requirement lower than a best effort requirement. Alternatively or additionally, the indication may be comprised in a PAGING RANAP message, a PAGING TYPE 1 RRC message, a PCH DATA FRAME of a Iub Frame Protocol, or in a PAGING S1AP message.

Alternatively or additionally, the radio network node may determine based on a certain condition to use the condition at all. As stated previously, the radio network node may initiate the condition procedure if the cell loads in a certain fraction of the potential cells are below the threshold or if at least one of the potential cells has sufficiently low load or if at least a fraction of the potential cells have available capacity above a capacity threshold or if at least one of the potential cells have available capacity above the threshold.

Action 403.

The radio network node determines whether the condition is fulfilled, which condition is associated with the cell 11. The condition may be defined as when a load in the cell 11 is below a threshold, as when the available capacity in the cell 11 is above a threshold, and/or defined as when loads in a fraction of potential cells are below a threshold. A potential cell is a cell that potentially serves the user equipment 10, e.g. in RA. The condition may be defined by load of the cell 11, available capacity in the cell 11, status of the cell 11, type of the cell 11, location of the cell 11, or any combination of the above. The condition may take other information into account as well, such as a time related condition or similar.

Action 404.

When the condition is fulfilled, the radio network node pages the user equipment 10 in the cell 11.

Action 405.

The radio network node may then receive a response from the user equipment 10 being paged.

Action 406.

The radio network node may furthermore transmit, or deliver as referred to above, the data to the user equipment 10 when said response is received. The data delivery is triggered when the page response is forwarded to and received in the core network. The data may be buffered in the core network or in a node containing the cache functionality from which it may be requested. The data is then forwarded by the radio network node to the user equipment 10. As an alternative, the radio network node may contain the cache functionality and/or core network functionality, enabling it to cache or buffer the data itself. The execution of the method may depend on the load situation in multiple cells, such that the condition is fulfilled in at least a certain fraction of the potential cells, wherein the certain fraction consists of at least one potential cell and at most all potential cells, wherein a potential cell is a cell that potentially serves the user equipment 10.

Figure 5:
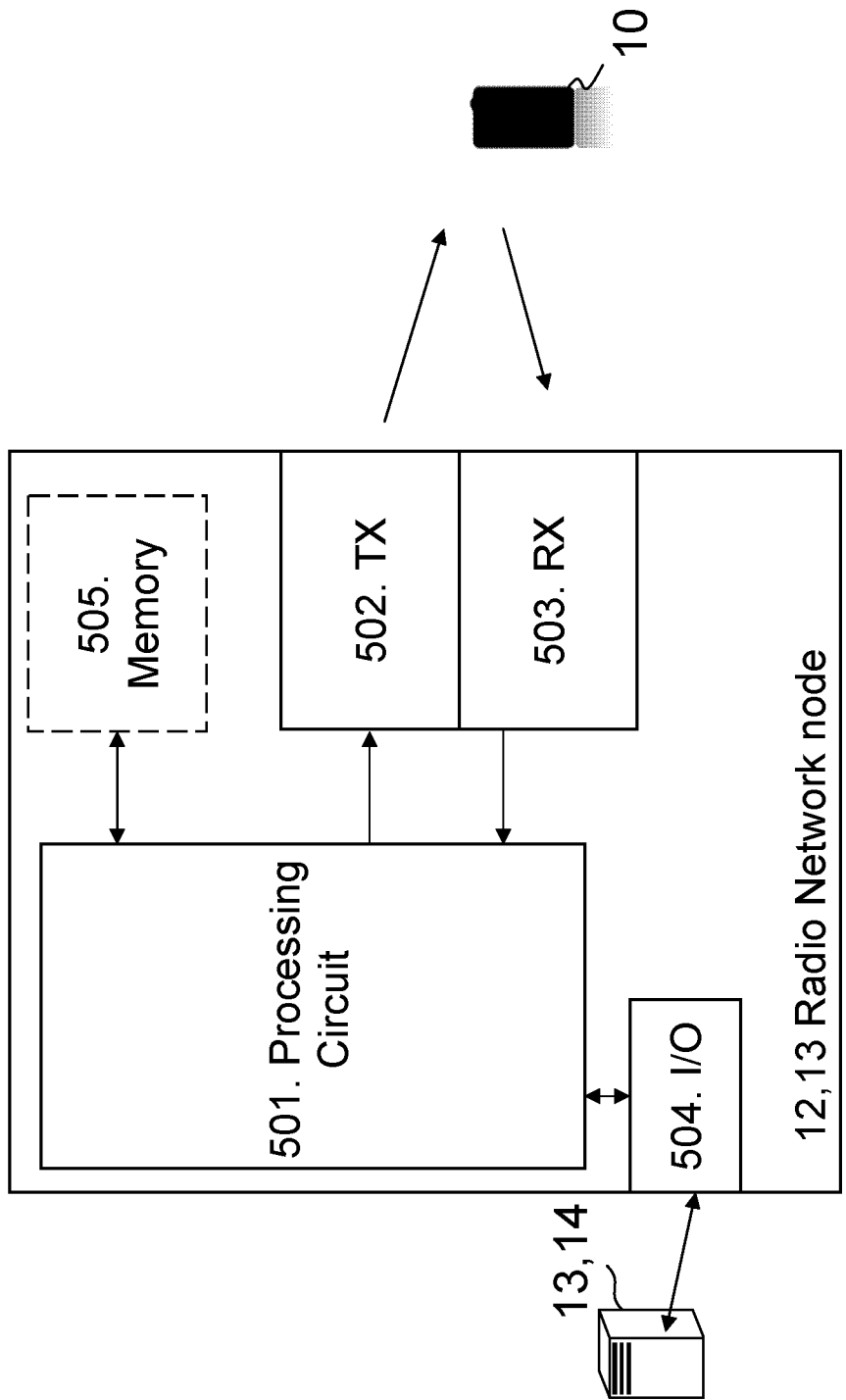
FIG. 5 is a block diagram depicting a radio network node according to embodiments herein.

FIG. 5 is a block diagram depicting the radio network node for paging the user equipment 10 in the radio communications network 1 according to some embodiments herein. As stated above the radio network node may be the radio base station 12, or the RNC 13 but may also be an EPS radio network controller node taking the decision whether to page the user equipment 10 based on whether the condition is fulfilled or not. The radio network node is configured to serve the cell 11 in the radio communications network 1.

The radio network node comprises a processing circuit 501 configured to determine whether a condition is fulfilled, which condition is associated with the cell 11. The condition may be defined as when a load in the cell 11 is below a threshold or as when the available capacity in the cell 11 is above a threshold. The condition may be defined by load of the cell 11, available capacity in the cell 11, status of the cell 11, type of the cell 11, location of the cell 11, or any combination of the above. In addition, the decision to initiate a conditional paging procedure, which means whether a paging procedure with a condition should be applied or not, may depend on the situation in multiple cells, i.e. the cells that the user equipment 10 may currently be located in, such that the conditional paging procedure is initiated only if the condition is fulfilled in at least a certain fraction of the potential cells, wherein a potential cell is a cell that potentially serves the user equipment 10. For instance, the conditional paging, for the purpose of LBE delivery, may be used if the cell loads in a certain fraction of the potential cells are below the threshold or if at least one of the potential cells has sufficiently low load or if at least a fraction of the potential cells have available capacity above a capacity threshold or if at least one of the potential cells have available capacity above the threshold, wherein a potential cell is a cell that potentially serves the user equipment 10. Then, the processing circuit 501 is configured to perform the determination of the condition depending on the load situation in multiple cells, such that the condition is fulfilled in at least a certain fraction of the potential cells, wherein the certain fraction consists of at least one potential cell and at most all potential cells, wherein a potential cell is a cell that potentially serves the user equipment 10.

The radio network node further comprises a transmitting circuit (TX) 502 configured to page, when the condition is fulfilled, the user equipment 10 in the cell 11. E.g. when the radio network node comprises a radio base station 12, the radio base station 12 transmits directly to the user equipment 10 using a radio transmitter. When the radio network node is the RNC 13, the RNC 13 sends the page message (PAGING TYPE 1), which is forwarded by the radio base station 12. The situation is similar in a scenario with an EPS radio network controller node deployed in EPS, i.e. the EPS radio network controller node sends a message to the radio base station, indicating that a UE is to be paged, and the radio base station forwards the message to the user equipment 10, or repackages the essential information in a new message, and forwards it to the user equipment 10. The data to be sent to the user equipment 10 may be data of a best effort quality requirement or lower than the best effort quality requirement.

The radio network node further comprises a receiving circuit (RX) 503 that may be configured to receive a response from the user equipment 10 being paged, and wherein the transmitter 502 is further configured to transmit data to the user equipment 10 when said response is received. The data delivery is triggered when the page response is forwarded to and received in the core network. The data may be buffered in the core network or in a node containing the cache functionality from which it may be requested. The data is then forwarded by the radio network node to the user equipment 10. As an alternative, the radio network node may contain the cache functionality and/or core network functionality, enabling it to cache or buffer the data itself. The transmitter 502 and the receiver 503 may be combined into a transceiver.

The radio network node may additionally comprise an input and output (I/O) interface 504 configured to receive the condition from the network node, or an Operation and Maintenance node, or the condition is stored in the radio network node, and the radio network node is configured to receive the condition from within the radio network node. The input and output interface 504 may alternatively or additionally be configured to receive an indication from a network node. The indication triggers the use of the condition when determining whether the condition is fulfilled. The indication may be that data is received on a bearer with a quality requirement lower than a best effort requirement. The indication may alternatively or additionally be comprised in a PAGING RANAP message, a PAGING TYPE 1 RRC message, a PCH DATA FRAME of a Iub Frame Protocol, or in a PAGING S1AP message.

The embodiments herein for paging the user equipment 10 in the radio communications network 1 may be implemented through one or more processors, such as the processing circuit 501 in the radio network node depicted in FIG. 5, together with computer program code for performing the functions and/or method actions of the embodiments herein. The program code mentioned above may also be provided as a computer program product, for instance in the form of a data carrier carrying computer program code for performing embodiments herein when being loaded into the radio network node. One such carrier may be in the form of a CD ROM disc. It is however feasible with other data carriers such as a memory stick. The computer program code may furthermore be provided as pure program code on a server and downloaded to the radio network node.

The radio network node comprises a memory 505 that may comprise one or more memory units and may be used to store for example data such as loads, condition, indication, page data, cached data, response, application to perform the methods herein when being executed on the radio network node, or similar.

Figure 6:
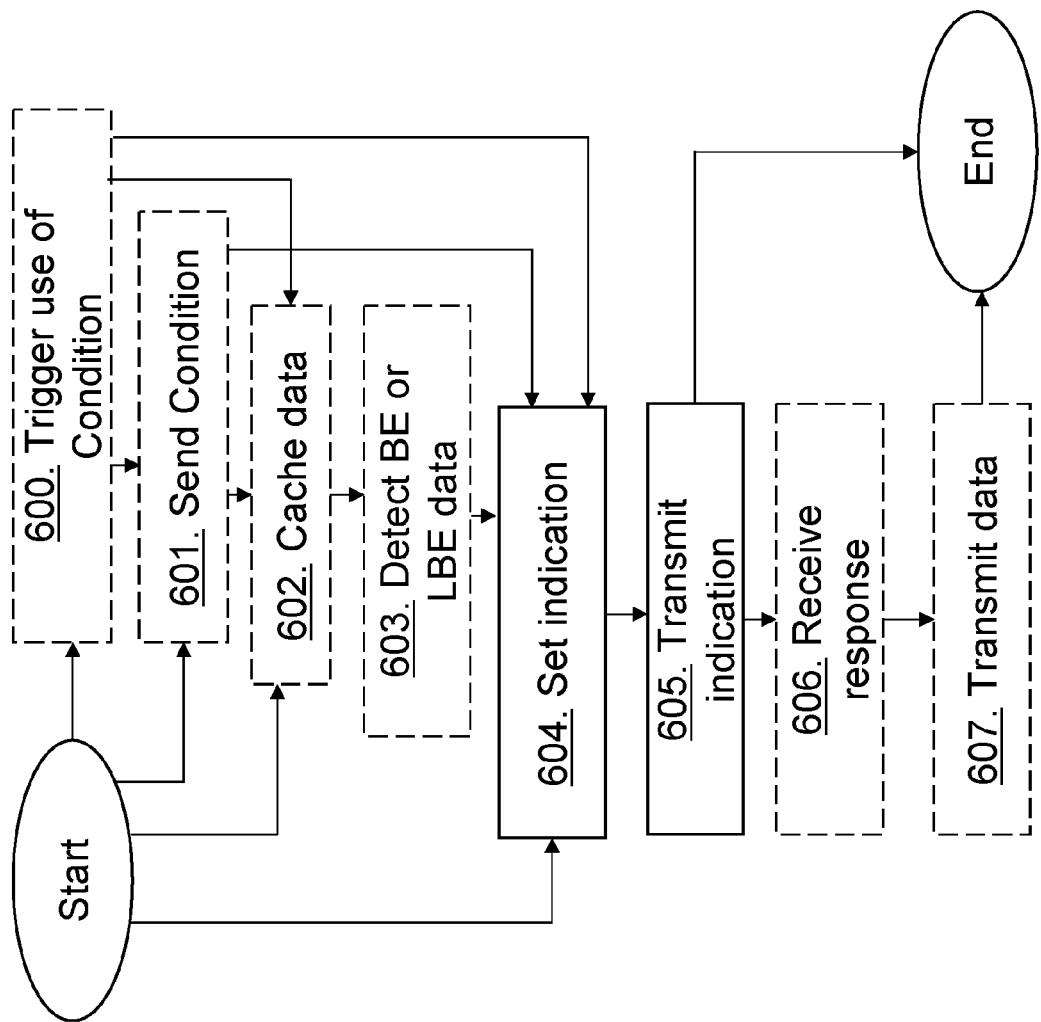
FIG. 6 is a schematic flow chart depicting a method in a network node according to embodiments herein.

The method actions in the network node, referred to as radio network controller 13 and core network node 14 in the figures, for triggering the paging of the user equipment 10 within the radio communications network 1 according to some embodiments will now be described with reference to a flowchart depicted in FIG. 6. The actions do not have to be taken in the order stated below, but may be taken in any suitable order. Actions performed in some embodiments are marked with dashed boxes. As stated above, the user equipment 10 is served in the cell 11 of the radio communications network 1 and the network node is comprised in the radio communications network 1. The core network node 14 may be a SGW, a PGW, a SGSN, a MME or similar. The core network node 14 may also be a new node, a stand-alone entity, comprised in the CN. The network node may further be any node comprising cache functionality or an EPS radio network controller node.

Action 600.

The network node may trigger the use of the condition when loads in a fraction of potential cells are below a threshold and/or the condition is fulfilled in at least a fraction of the potential cells, wherein a potential cell is a cell that potentially serves the user equipment 10.

Action 601.

The network node may send the condition to the radio network node. As stated above, the condition may e.g. be defined as when a load in the cell 11 is below a threshold, as when the available capacity in the cell 11 is above a threshold, or when loads in a fraction of potential cells are below a threshold, wherein a potential cell is a cell that potentially serves the user equipment 10, status of the cell 11, type of the cell 11, location of the cell 11, or any combination of the above.

Action 602.

The network node may cache or buffer data intended for the user equipment 10.

Action 603.

The network node may detect that the data is of a best effort quality requirement or lower than the best effort quality requirement and in response to that perform the actions of setting and transmitting the indication (see below).

Action 604.

The network node sets an indication indicating that paging of the user equipment 10 is only to be performed when a condition is fulfilled, which condition is associated with the cell 11. For example, the indication may be set in a message indicating that the paging is only to be performed when the condition is fulfilled. Additionally or alternatively, the network node may map data to a bearer associated with a service requirement below a best effort quality requirement. Thereby the indication if data is received over the bearer associated with LBE data.

Action 605.

The network node transmits the indication to the radio network node controlling the cell 11 in the radio communications network 1. The indication may be comprised in a PAGING RANAP message, a PAGING TYPE 1 RRC message, a PCH DATA FRAME of a Iub Frame Protocol, or in a PAGING S1AP message. It should be noted that the network node may send an indication, instruction or similar, to another network node which sends an indication to a radio network node. Thus, the network node may transmit the indication via one or more network nodes. For instance, the SGW 32 may notify the MME 36, which in turn initiates the conditional paging procedure and sends the indication to the radio base stations.

Action 606.

In some embodiments the network node receives a response or an indication that the user equipment 10 has responded to the paging.

Action 607.

When receiving the response or the indication, the network node transmits the cached or buffered data to the user equipment via the radio network node. The data may be cached or buffered in the network node or it may be requested from a node containing the cache functionality and forwarded to the user equipment via the radio network node.

Figure 7:
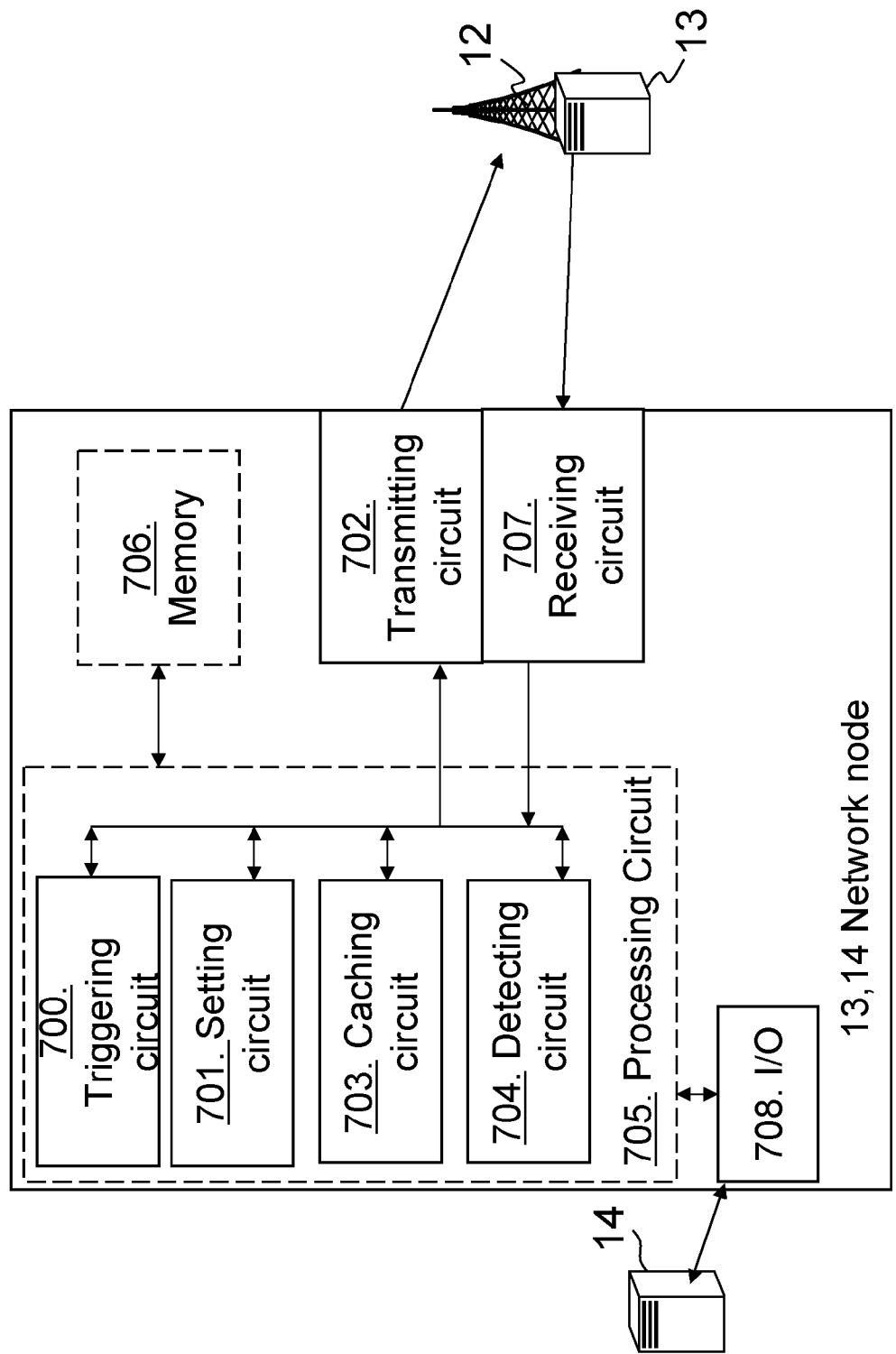
FIG. 7 is a block diagram depicting a network node according to embodiments herein.

FIG. 7 is a block diagram depicting the radio network node for triggering a paging of the user equipment 10 based on a condition within the radio communications network 1. The user equipment 10 is served in the cell 11 of the radio communications network 1. The network node may comprise the radio network controller 13, the EPS radio network controller node, the core network node 14, such as the SGW, PGW, MME, or any node comprising cache functionality.

The network node may comprise a triggering circuit 700 configured to trigger the use of the condition when loads in a fraction of potential cells are below a threshold, wherein a potential cell is a cell that potentially serves the user equipment 10. The triggering circuit 700 may additionally or alternatively be configured to trigger the use of the condition when the condition is fulfilled in at least a fraction of the potential cell, wherein a potential cell is a cell that potentially serves the user equipment 10.

The network node comprises a setting circuit 701 configured to set an indication indicating that paging of the user equipment 10 is only to be performed when the condition is fulfilled. The condition is associated with the cell 11. The setting circuit 701 may be configured to set the indication in a message indicating that the paging is only to be performed when the condition is fulfilled. In some embodiments, the setting circuit 701 is configured to map data to a bearer associated with a service requirement below a best effort quality requirement.

The condition may be defined as when a load in the cell 11 is below a threshold or as when the available capacity in the cell 11 is above a threshold. The condition may be defined by load of the cell 11, available capacity in the cell 11, status of the cell 11, type of the cell 11, location of the cell 11, or any combination of the above. In addition, the decision to initiate a conditional paging procedure, which means whether a paging procedure with a condition should be applied or not, may depend on the situation in multiple cells, i.e. the cells that the user equipment 10 may currently be located in, such that the conditional paging procedure is initiated only if the condition is fulfilled in at least a certain fraction of the potential cells, wherein a potential cell is a cell that potentially serves the user equipment 10. For instance, the conditional paging, for the purpose of LBE delivery, may be used if the cell loads in a certain fraction of the potential cells are below the threshold or if at least one of the potential cells has sufficiently low load or if at least a fraction of the potential cells have available capacity above a capacity threshold or if at least one of the potential cells have available capacity above the threshold, wherein a potential cell is a cell that potentially serves the user equipment 10.

The network node comprises a transmitting circuit 702 configured to transmit the indication to the radio network node controlling the cell 11 in the radio communications network 1. The transmitting circuit 702 may further be configured to send the condition to the radio network node. The indication may be comprised in a PAGING RANAP message, a PAGING TYPE 1 RRC message, a PCH DATA FRAME of a Iub Frame Protocol, or in a PAGING S1AP message.

The network node may further comprise a caching circuit 703 configured to cache data intended for the user equipment 10.

The network node may additionally comprise a detecting circuit 704 configured to detect that the data is of a best effort quality requirement or lower than the best effort quality requirement. Then, the setting circuit 701 and the transmitting circuit 702 is configured, in response to a detection of data that is of the best effort quality requirement or the lower than the best effort quality requirement, to perform the setting and the transmitting of the indication.

The embodiments herein for triggering the paging may be implemented through one or more processors, such as a processing circuit 705 in the network node depicted in FIG. 7, together with computer program code for performing the functions and/or method steps of the embodiments herein. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the network node.

The network node comprises a memory 706 that may comprise one or more memory units and may be used to store for example data such as cached data, service requirement, condition, indication, response, application to perform the methods herein when being executed on the network node, or similar.

Furthermore, the network node may comprise a receiving circuit 707 configured to receive a response from the user equipment 10 or an indication of that the user equipment 10 has responded. The network node may further comprise an I/O interface 708 configured to receive data intended for the user equipment 10 but also to communicate with other nodes in the radio communications network.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method of paging a user equipment in a radio communications network in response to data incoming to the radio communications network for delivery to the user equipment, the method comprising:
   determining that conditional paging is to be used for paging the user equipment in a cell in the radio communications network that is a potential cell for delivering the data to the user equipment, responsive to determining at least that the data is delay-insensitive data, wherein delay-insensitive data is tolerant of delivery delays that may arise when conditional paging is used; and
   responsive to determining that conditional paging is to be used in the potential cell, performing or initiating conditional paging of the user equipment in the potential cell, wherein the user equipment is or is not paged in the potential cell, in dependence on whether or not a condition associated with the potential cell is fulfilled.

2. The method according to claim 1, wherein the condition is defined as when a load in the potential cell is below a threshold or as when an available capacity in the potential cell is above a threshold.

3. The method according to claim 1, wherein the condition is defined by one or more of: a load of the cell, an available capacity in the cell, a status of the cell, a type of the cell, a location of the cell.

4. The method according to claim 1, wherein determining that the data is delay-insensitive data comprises determining that the data has a best effort quality requirement or lower than the best effort quality requirement.

5. The method according to claim 1, further comprising obtaining the condition from another network node.

6. The method according to claim 1, wherein determining that the data is delay-insensitive data comprises determining that the data was received on a bearer with a quality requirement lower than a best effort requirement.

7. The method according to claim 1, wherein determining that the data is delay-insensitive comprises making the determination from an indication in a PAGING RANAP message, a PAGING TYPE 1 RRC message, a PCH DATA FRAME of an Iub Frame Protocol, or in a PAGING S1AP message.

8. The method according to claim 1, wherein the node comprises one or any combination of a radio base station, a radio network controller, a caching node associated with caching the data, a mobility management entity, and a core network node.

9. The method of claim 1, wherein the potential cell is one among a plurality of potential cells, and wherein determining that conditional paging is to be used for paging the user equipment in the potential cell further comprises determining that conditional paging is to be used further in response to determining that the condition is fulfilled in a certain fraction or number of the plurality of potential cells.

10. The method of claim 1, wherein the condition is a load of the potential cell being below a defined threshold, or an available capacity of the potential cell being above a defined threshold.

11. The method of claim 1, further comprising, in response to the user equipment responding to being paged in the potential cell, transmitting, or initiating the transmission of, the data in the potential cell for the user equipment.

12. A node configured for controlling paging of a user equipment in a radio communications network, in relation to data incoming to the radio communications network for delivery to the user equipment, the node comprising:
   a transmitting circuit; and
   a processing circuit that is operatively associated with the transmitting circuit and configured to:

determine that conditional paging is to be used for paging the user equipment in a cell of the radio communications network that is a potential cell for delivering the data to the user equipment, responsive to determining at least that the data is delay-insensitive data, wherein delay-insensitive data is tolerant of delivery delays that may arise when conditional paging is used; and responsive to determining that conditional paging is to be used in the potential cell, perform or initiate conditional paging of the user equipment in the potential cell, using said transmitter circuit, wherein the user equipment is or is not paged in the potential cell, in dependence on whether or not a condition associated with the potential cell is fulfilled.

13. The node according to claim 12, wherein the potential cell is one among a plurality of potential cells, and wherein the processing circuit is configured to determine that conditional paging is to be used for paging the user equipment in the potential cell further based on determining that the condition is fulfilled in a certain fraction or number of the plurality of potential cells.

14. The node according to claim 12, wherein the condition is a load of the potential cell being below a defined threshold, or an available capacity of the potential cell being above a defined threshold.

15. The node according to claim 12, wherein, in response to the user equipment responding to being paged in the potential cell, the processing circuit is configured to transmit, or initiate the transmission of, the data in the potential cell for the user equipment.

16. The node according to claim 12, wherein the condition is defined as when a load in the potential cell is below a threshold or as when an available capacity in the potential cell is above a threshold.

17. The node according to claim 12, wherein the condition is defined by one or more of: a load of the cell, an available capacity in the cell, a status of the cell, a type of the cell, a location of the cell.

18. The node according to claim 12, wherein the processing circuit is configured to determine that the data is delay-insensitive data by determining that the data has a best effort quality requirement or lower than the best effort quality requirement.

19. The node according to claim 12, wherein the processing circuit is configured to obtain the condition from another network node in the radio communications network.

20. The method according to claim 12, wherein the processing circuit is configured to determine that the data is delay-insensitive data based on determining that the data was received on a bearer with a quality requirement lower than a best effort requirement.

21. The node according to claim 12, wherein the processing circuit is configured to determine that the data is delay-insensitive from an indication in a PAGING RANAP message, a PAGING TYPE 1 RRC message, a PCH DATA FRAME of an Iub Frame Protocol, or in a PAGING S1AP message.

22. The node according to claim 12, wherein the node comprises one or any combination of a radio base station, a radio network controller, a caching node associated with caching the data, a mobility management entity, and a core network node.

* * * * *